United States Patent
Der

(10) Patent No.: US 7,957,696 B2
(45) Date of Patent: Jun. 7, 2011

(54) SYSTEM AND METHOD FOR SELECTING CHANNELS FOR SHORT RANGE TRANSMISSIONS TO BROADCAST RECEIVERS

(75) Inventor: Lawrence Der, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 775 days.

(21) Appl. No.: 11/526,433

(22) Filed: Sep. 25, 2006

(65) Prior Publication Data

US 2008/0076352 A1    Mar. 27, 2008

(51) Int. Cl.
    *H04B 7/00* (2006.01)
(52) U.S. Cl. ......... 455/41.2; 455/522; 455/69; 455/134; 455/161.3; 455/226.2
(58) Field of Classification Search ................ 455/12.1, 455/13.2, 98, 427, 41.2, 41.3, 513, 515, 115.3, 455/134, 161.3, 226.2, 69, 522
See application file for complete search history.

(56) References Cited

U.S. PATENT DOCUMENTS

| | | | |
|---|---|---|---|
| 5,073,976 A | 12/1991 | Kennedy | 455/161 |
| 5,319,716 A | 6/1994 | McGreevy | 381/79 |
| 5,696,903 A | 12/1997 | Mahany | 395/200.58 |
| 5,862,235 A | 1/1999 | Kowalczyk | 381/79 |
| 5,867,794 A | 2/1999 | Hayes et al. | 455/557 |
| 5,970,390 A | 10/1999 | Koga et al. | 455/42 |
| 6,023,616 A | 2/2000 | Briskman | 455/344 |
| 6,389,270 B1 | 5/2002 | Nohrden et al. | 455/161.1 |
| 6,424,820 B1 | 7/2002 | Burdick et al. | 455/41 |
| 6,493,546 B2 | 12/2002 | Patsiokas | 455/277.1 |
| 6,782,239 B2 | 8/2004 | Johnson et al. | 455/42 |
| 6,810,233 B2 | 10/2004 | Patsiokas | 455/3.02 |
| 7,062,238 B2 | 6/2006 | Glaza | 455/161.1 |
| 7,076,204 B2 | 7/2006 | Richenstein et al. | 455/3.06 |
| 7,082,203 B1 | 7/2006 | Drakoulis et al. | 381/77 |
| 7,107,030 B1 | 9/2006 | Furmidge | 455/232.1 |
| 7,515,548 B2 * | 4/2009 | Chandra et al. | 370/252 |
| 7,573,847 B2 * | 8/2009 | Rogers et al. | 370/329 |
| 2002/0136268 A1 * | 9/2002 | Gan et al. | 375/133 |
| 2003/0043769 A1 | 3/2003 | Dolman et al. | 370/337 |
| 2004/0038645 A1 * | 2/2004 | Rcunamaki et al. | 455/41.2 |
| 2004/0117442 A1 | 6/2004 | Thielen | 709/203 |
| 2004/0161050 A1 * | 8/2004 | Larsson et al. | 375/267 |
| 2004/0224638 A1 * | 11/2004 | Fadell et al. | 455/66.1 |
| 2006/0152424 A1 | 7/2006 | Miyagi | 343/713 |
| 2006/0235958 A1 * | 10/2006 | Motoyama | 709/223 |
| 2006/0280270 A1 * | 12/2006 | Ibrahim et al. | 375/354 |
| 2007/0071246 A1 | 3/2007 | Miyagi | 381/15 |
| 2007/0121521 A1 * | 5/2007 | D'Amico et al. | 370/252 |
| 2007/0155440 A1 | 7/2007 | Everett et al. | 455/569.2 |

OTHER PUBLICATIONS

PCT/US2007/017946, "International Search Report" Jan. 18, 2008.

* cited by examiner

*Primary Examiner* — Dominic E Rego
(74) *Attorney, Agent, or Firm* — O'Keefe, Egan, Peterman & Enders, LLP

(57) ABSTRACT

Methods and systems for determining transmission channels for short range transmissions are disclosed. A transmitter provides short range transmission to a broadcast receiver configured to receive and tune channels within a signal spectrum. Channels within the broadcast signal spectrum are scanned, and an indication of received signal strength is obtained for each channel. The received signal strength indication (RSSI) can then be compared to a threshold power level that correlates to a signal level that the transmitter will be capable of overpowering based upon the transmission power of the transmitter. The scan results in an indication of one or more channels that have received signal strengths below the threshold power level of the transmitter.

21 Claims, 4 Drawing Sheets

US 7,957,696 B2

SYSTEM AND METHOD FOR SELECTING CHANNELS FOR SHORT RANGE TRANSMISSIONS TO BROADCAST RECEIVERS

TECHNICAL FIELD OF THE INVENTION

This invention relates to short range wireless transmissions from electronic devices to broadcast receivers and, more particularly, to selecting channels for such short range transmissions to broadcast receivers.

BACKGROUND

Short range wireless communication systems have been used previously to provide communications between electronic devices and broadcast receivers. As with many communication systems, power and bandwidth are fundamental resources for such short range wireless communication systems, and these parameters can be selected to determine the performance and power requirements of a short range wireless communication system. Typically, the transmitter power is selected to be low so as to limit its range and its power requirements. One problem associated with these short range broadcasts to a broadcast receiver, however, is that interference from external broadcasts will interfere with the broadcast from the short range transmitter. It is desirable, therefore, to identify and select a channel that is not being used.

To identify open channels, one current system provides an RF (radio frequency) modulator to convert a composite signal to an RF channel selected using a scanning receiver. The scanning receiver locates RF channels that are not in use by broadcast stations in a particular geographic area. These unused stations are identified by determining channels having signal-to-noise ratios below a threshold value indicative of an open or unused channel. When used for short range broadcasts, such unused channels typically do not exhibit the hissing or muting associated with a channel containing even a weak external broadcast signal. Unfortunately, unused channels are becoming increasingly difficult to locate due to the overpopulation of broadcast stations occupying the set number of channels available.

Some current devices, such as portable music players, portable DVD players, and other electronic devices, are often combined with OEM (original equipment manufacturer) or after-market electronics that allow the devices to transmit media content on broadcast channels within a frequency band. One example of such a solution is the use of an FM transmitter in combination with portable media players to allow the media content to be broadcast from the portable device to a local receiver through short range FM broadcasts.

One common environment in which FM transmitters are often utilized is with respect to automobile electronics. A portable music player, satellite receiver, DVD player, or other electronic device can transmit media content to the car entertainment systems through FM transmissions so that wires are not needed. For example, an FM broadcast receiver within a car can be tuned to an open channel, and an FM transmitter can be tuned to transmit on this same channel. As such, the audio content on the portable player can be played through the car's audio system. Unfortunately, external radio broadcasts can interfere with this process, especially if a user is traveling by car, for example, while using such a device and coming within range of different broadcasts over the FM band.

Because unused or open channels are becoming more and more difficult to find, an improved short range transmission system is needed for allowing a user to better determine and select what channel or channels to use when employing short range broadcasts.

SUMMARY OF THE INVENTION

Methods and systems for selecting channels for short range transmissions to broadcast receivers are disclosed. In one embodiment, a transmitter provides short range transmissions to a broadcast receiver configured to receive and tune channels within a signal spectrum. Channels within the broadcast signal spectrum are scanned, and an indication of received signal strength is obtained for each channel. The received signal strength indications can then be compared to a threshold power level that correlates to the power of the particular transmitter. This threshold power level, in particular, can correlate to a signal level that the transmitter will be capable of overpowering based upon the transmission power of the transmitter. The channel scanning process results in an indication of one or more channels that have received signal strengths below the threshold power level of the transmitter. If desired, a receiver and a transmitter can be integrated within the same integrated circuit, and the integrated receiver can be utilized to scan channels within the signal spectrum. In addition, the receiver and transmitter can be configured to operate in the FM broadcast band. As described below, other features and variations can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Methods and systems are described herein for identifying and selecting transmission channels for short range transmission to broadcast receivers. Channels within the broadcast signal spectrum are scanned to identify channels having a received signal strength below a threshold power level that correlates to the transmission power of the transmitter. These channels can then be selected and used for short range broadcasts.

Figure 1:
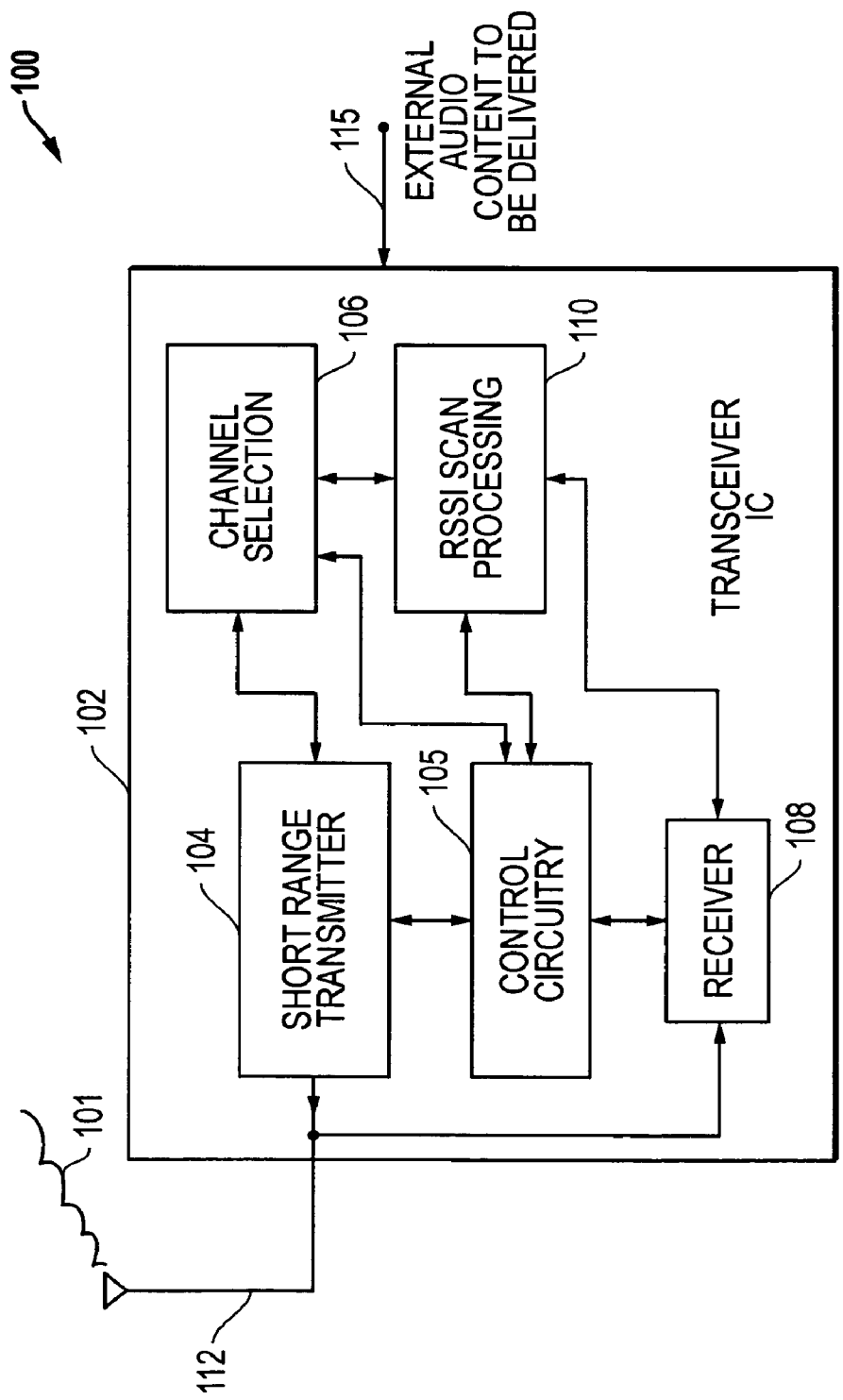
FIG. 1 is a block diagram of a transceiver system for selecting transmission channels for short range broadcasts to broadcast receivers.

FIG. 1 is a block diagram of system 100 including a transceiver integrated circuit 102 for providing short range transmissions to broadcast receivers. As depicted, a transmitter 104 provides short range transmission 101 via an antenna 112 to a broadcast receiver (not shown). A receiver 108 is configured to receive a signal spectrum through antenna 112 and is configured to tune channels within the signal spectrum. RSSI (receive signal strength indicator) scan processing circuitry 110 is coupled to the receiver 108 and operates to determine an indication of the received signal strength for channels tuned by the receiver 108. Control circuitry 105 is coupled to the RSSI scan processing circuitry 110 and to the other circuit blocks and in part operates to compare the received signal strength for each channel to a threshold power level. As described herein, this threshold power level correlates to the transmission power level of the transmitter 104. Channel selection circuitry 106 is coupled to the RSSI scan processing circuitry 110 and outputs an indication of the selected channel and/or the one or more channels that have signal strengths below the threshold power level. The control circuitry 105 can be, for example, a microcontroller and/or a digital signal processor (DSP) that provides the processing and control signals for the transceiver.

As discussed in more detail below, the RSSI scan processing circuitry 110 operates to determine what channels within a signal spectrum have signal strengths below a threshold power level that correlates to the transmission power of the transmitter 104. Because unused or open channels are becoming difficult to locate, the RSSI scan processing circuitry 110 attempts to locate channels having signals that can be overpowered by the transmitter 104 based upon its particular transmission power. Thus, depending upon how transmitter 104 is designed and the transmission power it uses in operation, one or more channels may have low enough signal strengths such that transmitter 104 will be able to overpower them through its short range transmissions. As such, used channels can be selected and utilized by the system.

As depicted, the transmitter 104 and the receiver 108 are integrated within the same transceiver integrated circuit 102. It is noted, however, that the transmitter 104 and receiver 108 are not required to be integrated together in order to take advantage of the RSSI scan and threshold power level comparison technique described herein. In addition, content to be broadcast can originate from a variety of sources including an external source such as external audio content 115 and an internal sources such as the receiver 108.

Figure 2:
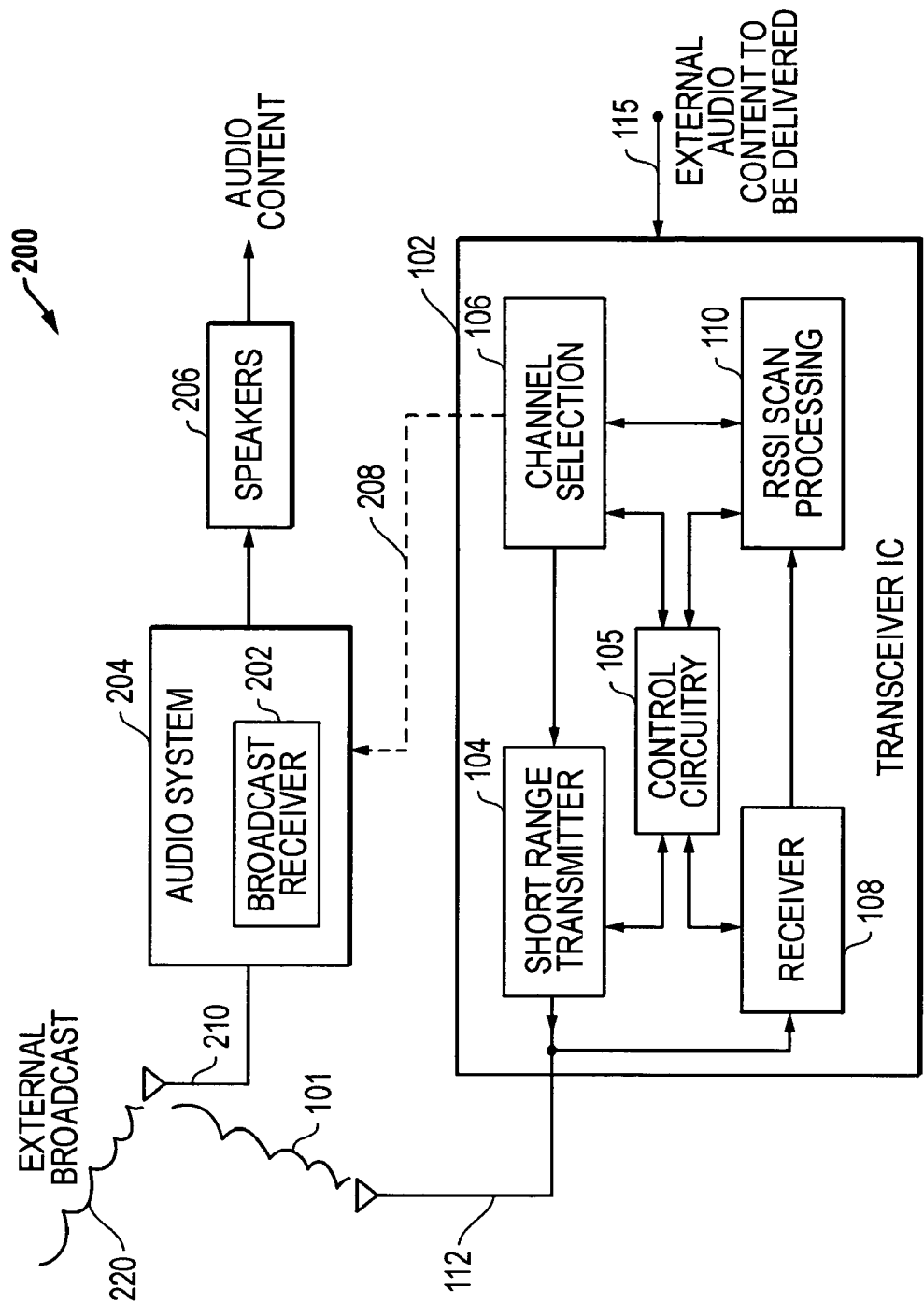
FIG. 2 is a block diagram of a transceiver system and an external audio system.

FIG. 2 is a block diagram of an example environment 200 in which the transceiver 102 of FIG. 1 is communicating with an external audio system 204. As depicted, audio system 204 includes a receiver 202 and is coupled to speakers 206. The receiver 202 is coupled to antenna 210 and receives the short range transmission 101 from the transceiver 102. As with FIG. 1, the transceiver 102 includes a transmitter 104, a receiver 108, channel selection circuitry 106, RSSI scan processing circuitry 110, and control circuitry 105. The transmitter 104 sends short range transmission 101 via an antenna 112 to a broadcast receiver 204 through antenna 210. In addition, as shown by dotted line 208, the channel information output by the channel selection circuitry 106 can be communicated to audio system 204, as well. This communication 208 can take the form of a wired connection or a wireless connection depending upon the implementation desired.

As discussed above, the receiver 108 scans a plurality of channels within the broadcast signal spectrum to determine channels having an RSSI below a threshold power level associated with the transmitter 104. In particular, the channels are scanned for receive power less than or equal to X watts, wherein X is a threshold power level that correlates to the transmission strength of the transmitter 104. In particular, X represents the power level of the channel energy at which transmitter 104 will be able to overpower the noise or signal energy on the particular channel and achieve adequate transmission over that channel. In other words, an RSSI level below X means that the transmitter 104 will be able to effectively overpower the channel energy and achieve a good quality signal connection with the external audio system 204. An RSSI level above X means that the transmitter 104 will not be able to overpower the channel energy and a poor quality signal connection will result. In operation, the signal spectrum or band can be scanned one time or continuously over time to find channels with a received power less than or equal to the threshold value X.

In contrast with prior solutions, the current threshold power level based approach of the present invention allows the use of non-open channels. Proper transmission and reception can be achieved over such channels even though they may have weak broadcast signals or noise because a determination is made that the transmit power of the transmitter 104 will be adequate to overpower or dominate these weak signals with respect to short range transmissions to audio system 204. Initially, an indication of received signal strength for each channel is determined. The received signal strength for each channel is then compared to the threshold power level. An indication of one or more channels that have RSSI values below the threshold value are output. In addition, it is noted that a first channel and/or all of the located usable channels can be recorded or stored in a memory device within the transceiver integrated circuit 102 or within the audio system 204 or both. These identified channels are then used for short range transmission between transceiver 102 and audio system 204.

The broadcast receiver 202 also receives external broadcasts 220 in addition to short range transmission 101 via antenna 210. As indicated above, the audio system 204 can be configured to communicate with the transceiver 102 to receive channel RSSI information from channel selection circuitry 106 through connection 208. When a channel has been selected for the short range transmissions 101, the transmitter 104 can transmit audio content to audio system 204 for output through speakers 206. It is noted that the audio content can be audio content 115 delivered to the transceiver 102 for short range transmissions. For example, where the audio content is from a portable music player, this audio content can be provided to transceiver 102 as audio content 115.

It is also noted that the receiver 108, the transmitter 104, and the receiver 202 can be configured to operate within then same signal spectrum, and this signal spectrum can be, for example, a terrestrial audio broadcast band, such as the FM audio broadcast band. As such, the transceiver 102 uses receiver 108 to receive and tune the FM channels for purpose of the RSSI scan process. The transceiver 102 uses transmitter 104 to transmit desired content on an FM channel. And audio system 204 tunes its receiver 202 to the proper FM channel so as to receive this audio content. The broadcast receiver, therefore, may be designed to receive commercial broadcasts, such as AM/FM terrestrial broadcasts and/or satellite broadcasts.

The transmitter 204 could also be provided with dynamic transmit power capabilities. As such, the transmitter 204 can be adjusted by control circuitry 105 on the integrated circuit 102 such that its transmit power is not constant but varies based upon control signals. This operation could be advantageous in that the transmit power level of the transmitter 204 could be adjusted so that it is strong enough to overcome the signal strength determined to be on a desired transmission channel, but not so strong as to waste power. With the current desire for portable devices to operate on battery power and to maintain battery life, reduced power consumption is typically advantageous. By applying dynamic transmit power to the transmitter 204, power can be conserved when it is not needed to overcome low signal levels on the desired transmit channels, and power can be increased when it is needed to overcome stronger signal levels. In other words, the transmit power can be adjusted to be a minimum power level required for transmission on a usable channel, allowing a user to conserve power by operating at a minimum required power level instead of a fixed power level. This power level adjustment can be done manually by the user, or can be automatically adjusted once a required power level is determined based upon the determined threshold level of a broadcast signal. Because the present invention contemplates a threshold power level that is associated with the transmit power of the transmitter rather than some objective threshold value tied to a representation of an open or unused channel, as done in prior art solutions, the present invention allows for advantageous use of non-open channels, as well as dynamic application of transmit power.

Figure 3:
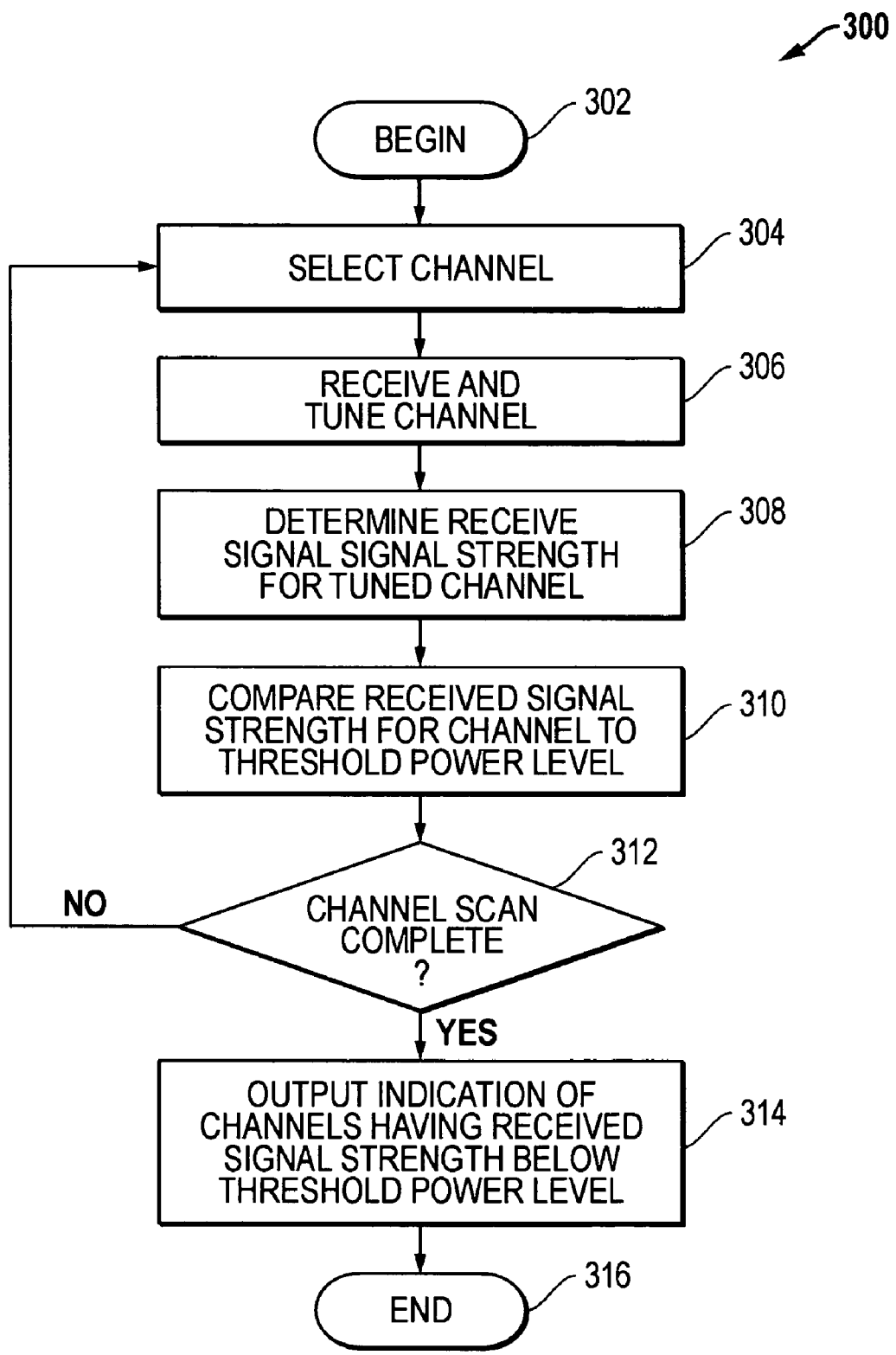
FIG. 3 is a flowchart of a process related to a transceiver system identifying transmission channels for short range transmissions.

FIG. 3 is an example flowchart 300 for steps involved in determining transmission channels for short range transmission to a broadcast receiver. The RSSI scan process begins in step 302. In process step 304, a channel is selected. This channel is then received and tuned in process step 306. In process step 308, a determination is made of the received signal strength for the channel tuned by the receiver. In process step 310, the received signal strength for the channel is compared to a threshold value that correlates to a power level for the transmitter. Next, decision step is reached where a determination is made whether the channel scan is complete. If "No," then control passes back to process step 304 where the next channel is selected. If "Yes," then flow passes to process step 314 where an indication is output of the channels having received signal strengths below the threshold value. The process ends in block 316. It is noted that this is only an example process flow and other process flows could be utilized while still taking advantage of channel scanning correlated to the transmit power of the transmitter that will provide the short range transmissions.

Figure 4:
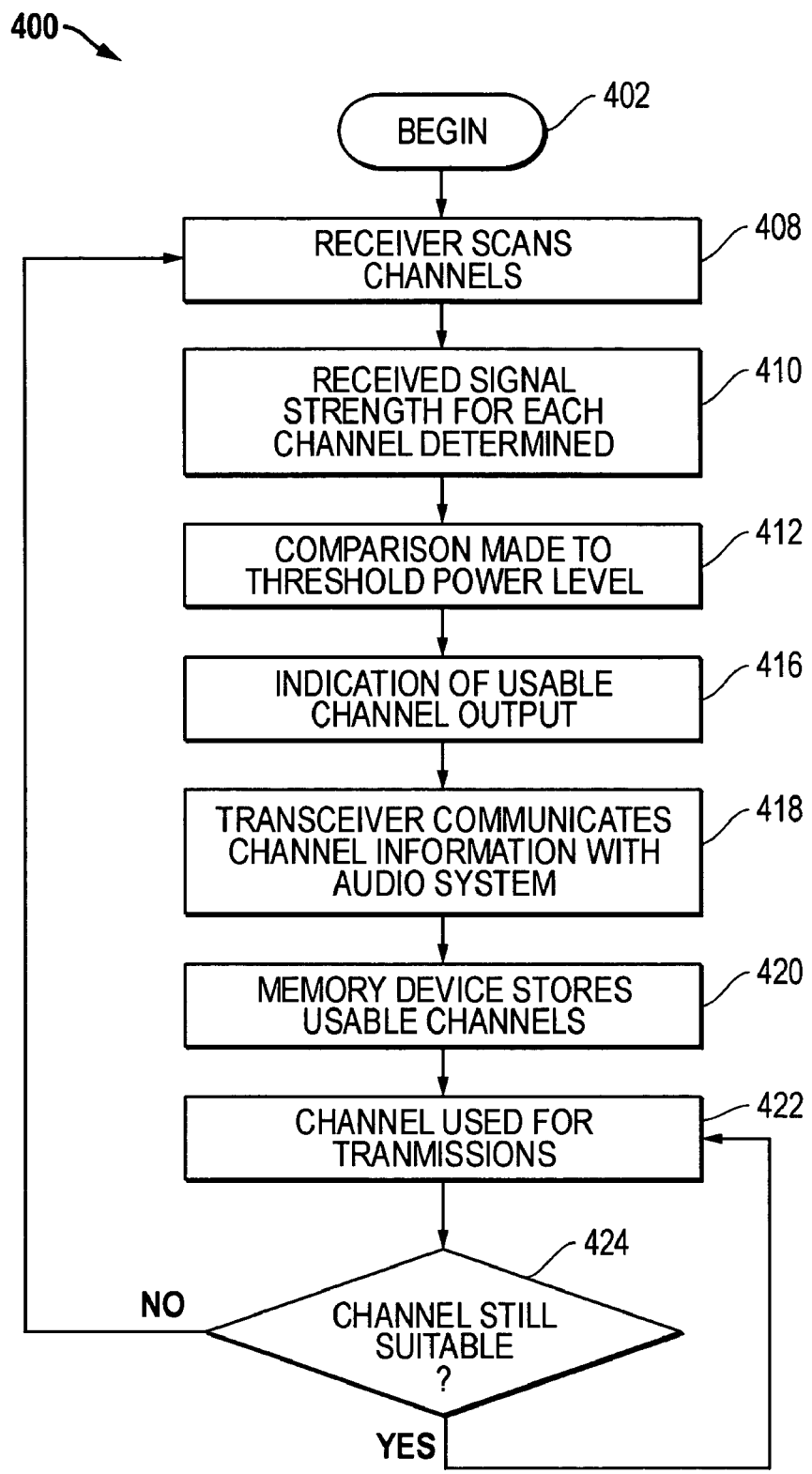
FIG. 4 is a flowchart of a process for selecting transmission channels for short range broadcasts to external audio systems.

FIG. 4 is an example flowchart 400 for steps involved in determining transmission channels for short range transmission to a broadcast receiver. The process begins with process step 402. In process step 408, the receiver scans a plurality of channels within the broadcast signal spectrum. As the receiver scans the channels, a level of received signal strength is determined for each channel as represented by process step 410. The received signal strength for each channel is compared to a threshold power level as represented by process step 412. Next, in process step 416, an indication is output of one or more channels that have received signal strengths below the threshold value. In process step 418, the transceiver communicates with an audio system that has a broadcast receiver. As discussed above, a connection between the transceiver and the audio system can provide an indication of one or more channels having received signal strength below the threshold value. These channels are identified as usable channels. In process step 410, a memory device can record or store the usable channels. In process step 422, a channel is used for transmission.

If desired, the system can then continuously monitor the current channel or monitor the current channel in discrete intervals or at desired times to discover whether the current transmit channel is still suitable for transmission. This determination is represented by decision step 424 where a determination is made regarding whether a current transmit channel is still suitable for transmission. If "Yes," then transmissions continue on the current transmission channel as represented by the arrow going back to step 422. If "No," the flow moves back to process step 408 where the scan process repeats.

As described above, the threshold value correlates to a power level for the transmitter that will provide the short range transmissions. As a result of the RSSI scan and comparison, an indication of one or more channels having received signal strengths below the threshold value can be output and utilized. For example, information can be sent to the external audio system to let the system know which channel the transmitter will transmit on and/or or allow the external audio system to determine which channel will be used for short range transmissions. As such, the audio system can automatically switch channels to a desired transmit channel, if it is not currently on the transmit channel. If desired, the audio system could automatically select the channel for short range transmissions and communicate with the transmitter to indicate the channel that should be used. This automated operation helps to eliminate the need for any user interaction in changing channels so that the short range transmissions will be effective. It is noted that user interaction or involvement in the channel selection process could still be provided, if desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method of identifying transmission channels for short range transmissions to broadcast receivers, comprising:
   providing a transmitter configured to provide short range transmissions to an external broadcast receiver configured to tune channels within a broadcast signal spectrum;
   using a receiver to scan a plurality of channels within the broadcast signal spectrum;
   determining for each channel a received signal strength for that channel;
   comparing the received signal strength for each channel to a threshold power level, the threshold power level correlating to a transmit power for the transmitter and representing a power level of channel energy at which the transmitter can overpower the channel energy;
   identifying one or more channels that have received signal strengths below the threshold power level, the one or more channels including non-open channels having a received signal strength below the threshold power level; and
   outputting an indication of these one or more channels.

2. The method of claim 1, wherein the receiver is configured to receive terrestrial audio broadcasts.

3. The method of claim 1, wherein the broadcast signal spectrum comprises an FM band.

4. The method of claim 1, further comprising communicating between the external broadcast receiver and the transmitter using one or more of the identified channels that have received signal strengths below the threshold power level.

5. The method of claim 1, further comprising providing a receiver and a transmitter integrated on the same integrated circuit.

6. The method of claim 5, further comprising communicating channel information from the integrated circuit to the external broadcast receiver.

7. The method of claim 6, wherein the receiver, the transmitter and the external broadcast receiver each are configured to be operable in an FM band.

8. The method of claim 1, further comprising adjusting transmit power for the transmitter to increase or decrease the transmit power level.

9. The method of claim 1, further comprising selecting a channel for short range transmissions, using the selected channel for short range transmissions, and monitoring the selected channel to determine changes in its receive signal strength.

10. The method of claim 9, further comprising repeating the using, determining, comparing, identifying and outputting steps if the receive signal strength of the selected channel goes above the threshold power level.

11. The method of claim 9, further comprising adjusting transmit power for the transmitter in response to changes in the receive signal strength of the selected channel.

12. A system for providing short range transmissions to broadcast receivers, comprising:
   a transmitter configured to provide short range transmissions to a broadcast receiver configured to tune channels within a broadcast signal spectrum;
   a receiver configured to receive and tune channels within the broadcast signal spectrum;
   receive signal strength indication circuitry configured to determine a received signal strength for a channel tuned by the receiver; and
   control circuitry coupled to the receive signal strength indication circuitry and configured to compare the received signal strength for each of a plurality channels to a threshold power level correlating to a transmit power for the transmitter and representing a power level of channel energy at which the transmitter can overpower the channel energy, the control circuitry being further configured to output an indication of one or more channels that have received signal strengths below the threshold value, the one or more channels including non-open channels having a received signal strength below the threshold power level.

13. The system of claim 12, wherein the receiver is configured to receive terrestrial audio broadcasts.

14. The system of claim 13, wherein the broadcast signal spectrum is FM band.

15. The system of claim 12, further comprising an external broadcast receiver and wherein the transmitter is configured to use one or more channels that have received signal strengths below the threshold power level to communicate with the external broadcast receiver.

16. The system of claim 12, wherein the receiver and the transmitter are integrated within the same integrated circuit.

17. The system of claim 16, further comprising an external audio system including a broadcast receiver.

18. The system of claim 17, wherein the receiver, the transmitter and the broadcast receiver each are configured to be operable in an FM band.

19. The system of claim 17, further comprising a connection between the transceiver and the external audio system configured to provide an indication of one or more channels having received signal strength below the threshold value.

20. The system of claim 19, wherein the external audio system is configured to select a channel to be used for short range transmissions.

21. The system of claim 12, wherein the transmit power for the transmitter is configured to be adjusted based upon the signal strength comparisons.

* * * * *